Nov. 30, 1926.
H. L. QUINTENZ
1,608,809
COMBINED BRAKE AND ACCELERATOR
Filed Oct. 23, 1925    4 Sheets-Sheet 1
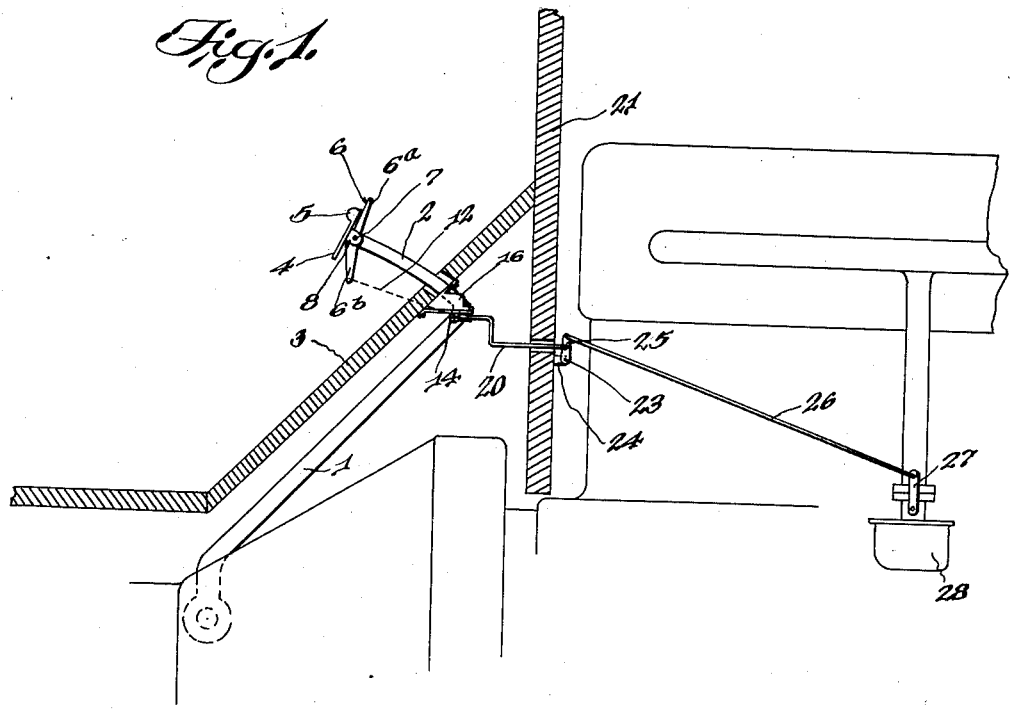
Fig. 1.
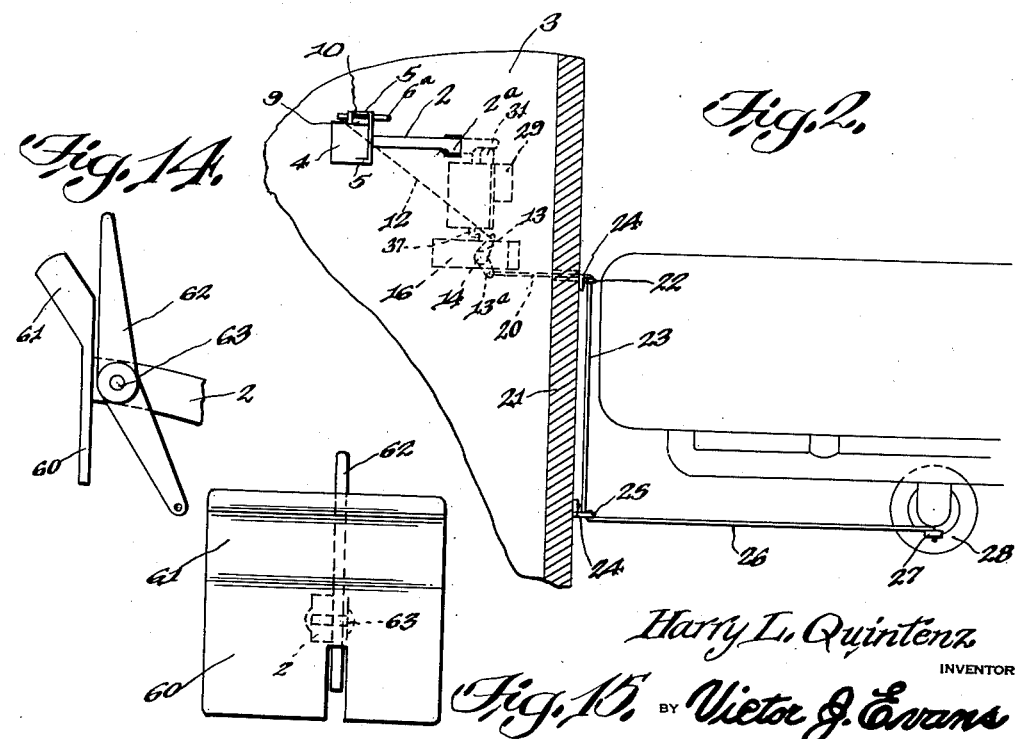
Fig. 14.    Fig. 2.
Fig. 15.
Harry L. Quintenz
INVENTOR
BY Victor J. Evans
ATTORNEY Nov. 30, 1926.
H. L. QUINTENZ
1,608,809
COMBINED BRAKE AND ACCELERATOR
Filed Oct. 23, 1925    4 Sheets-Sheet 2
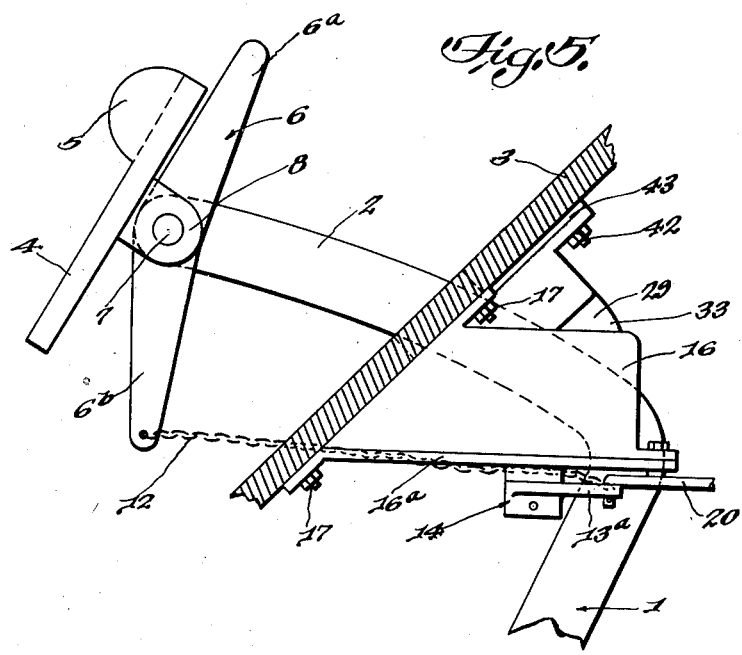
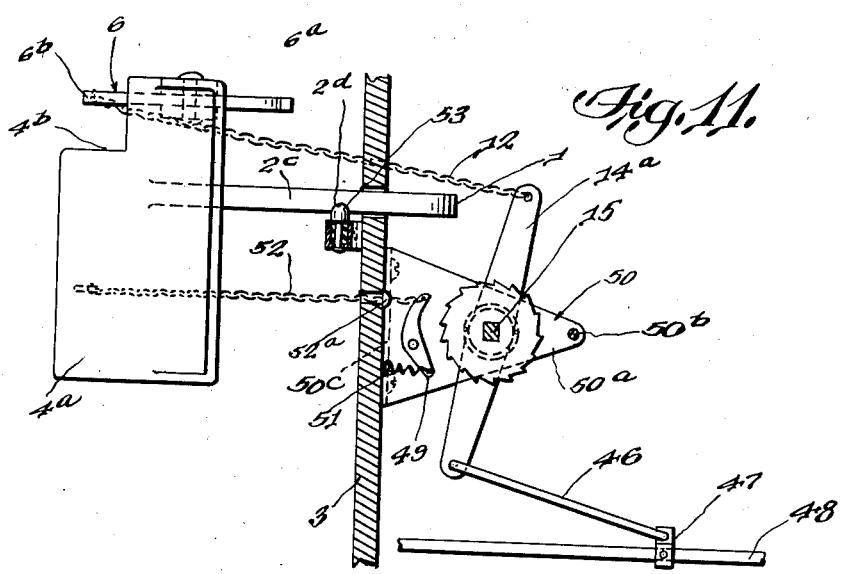
Harry L. Quintenz
INVENTOR
BY Victor J. Evans
ATTORNEY Nov. 30, 1926.
H. L. QUINTENZ
1,608,809
COMBINED BRAKE AND ACCELERATOR
Filed Oct. 23, 1925    4 Sheets-Sheet 3
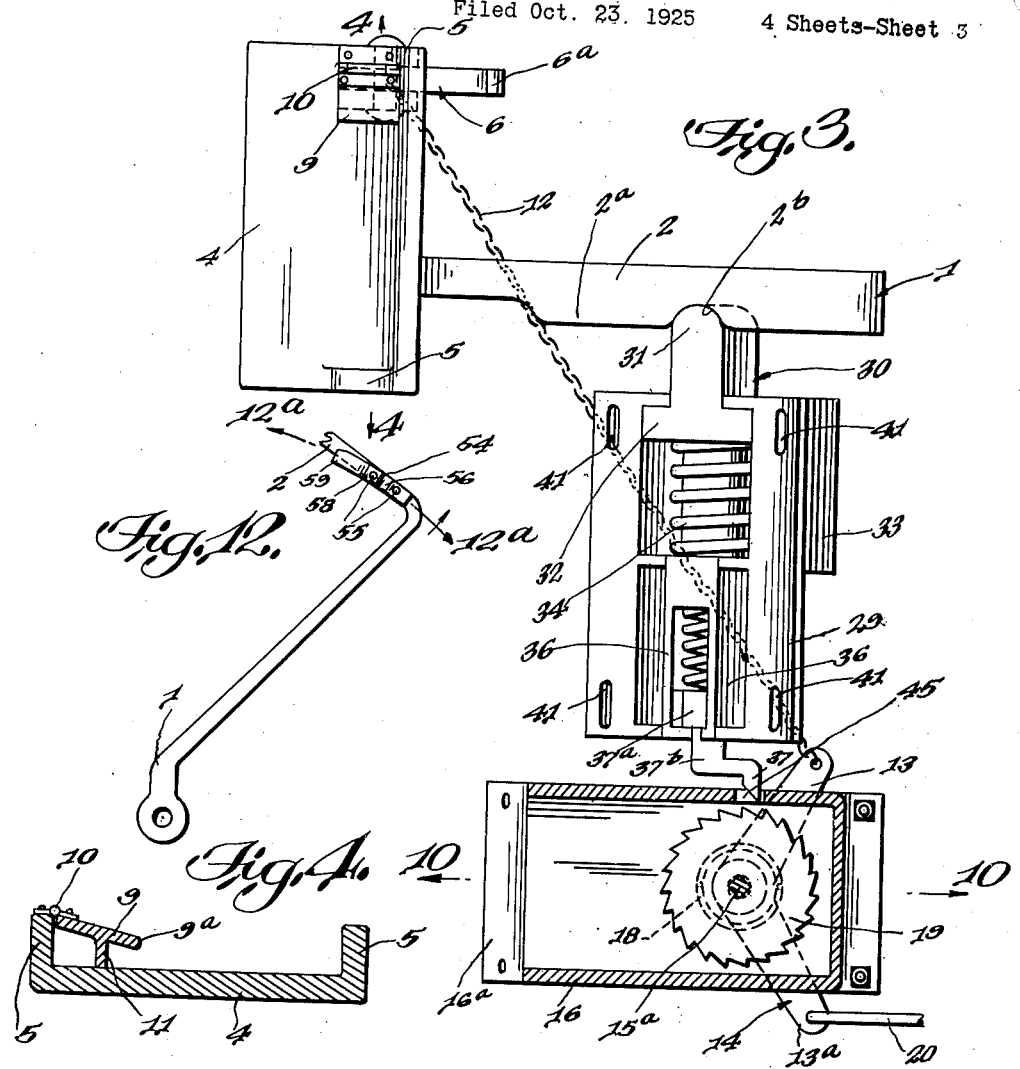
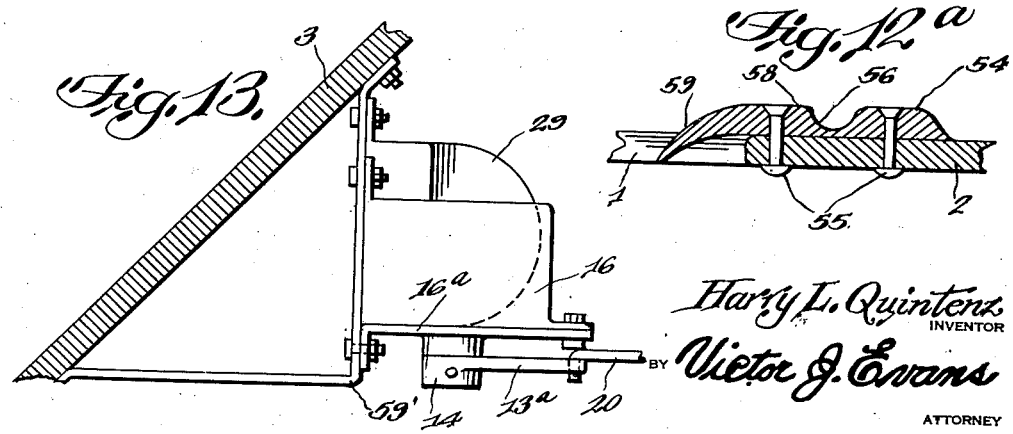
Harry L. Quintenz, INVENTOR
BY Victor J. Evans ATTORNEY Nov. 30, 1926.
H. L. QUINTENZ
1,608,809
COMBINED BRAKE AND ACCELERATOR
Filed Oct. 23, 1925    4 Sheets-Sheet 4
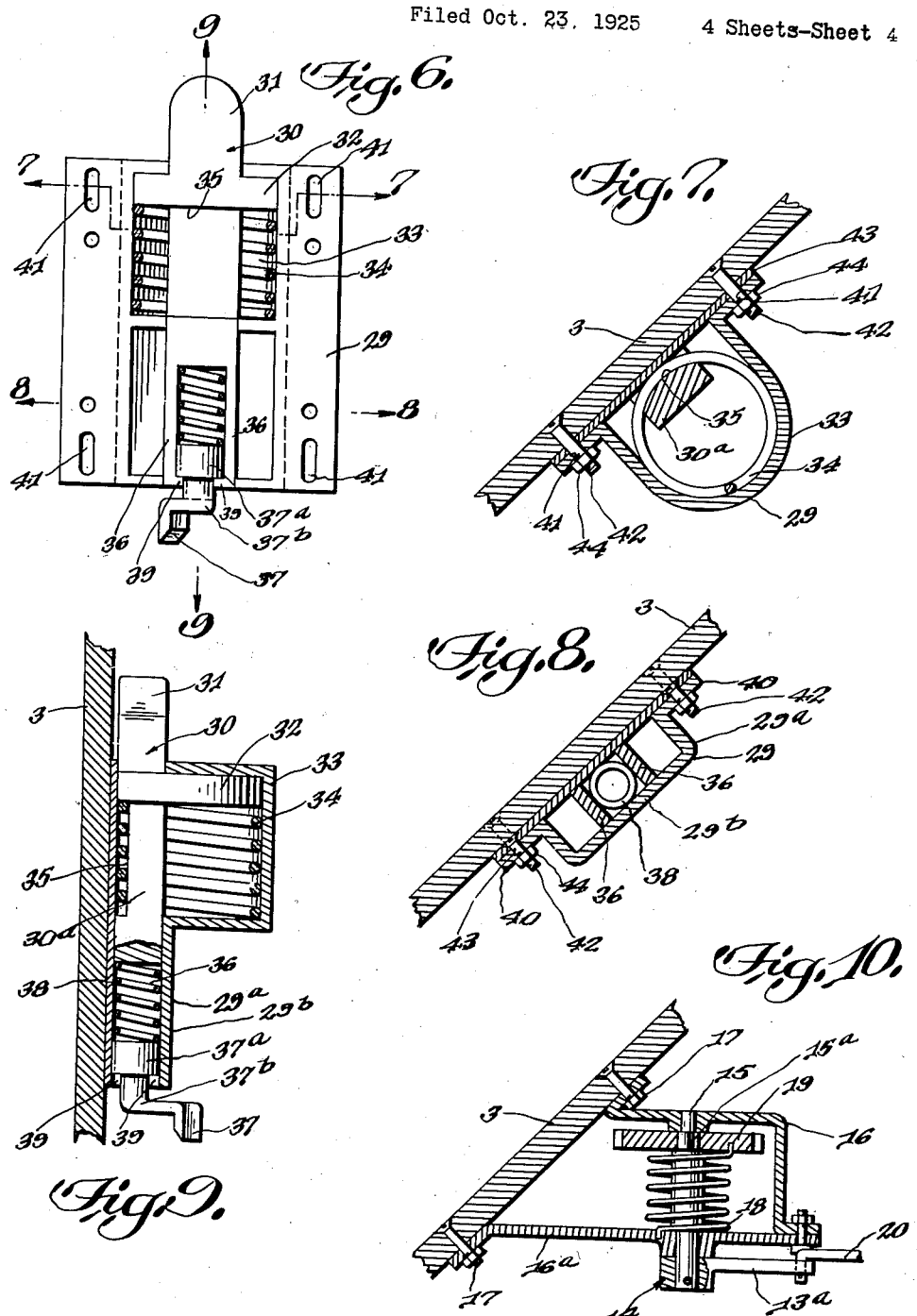

Patented Nov. 30, 1926.

1,608,809

UNITED STATES PATENT OFFICE.

HARRY L. QUINTENZ, OF CHICAGO, ILLINOIS.

COMBINED BRAKE AND ACCELERATOR.

Application filed October 23, 1925. Serial No. 64,403.

This invention relates to automobile attachments, and more particularly to what I term a combined brake and accelerator.

One of the main objects of the invention is to provide means which can be readily attached to and associated with the brake lever pedal of an automobile in such manner as to facilitate operation of the throttle valve of the carburetor for accelerating the engine. A further object is to provide means of this character of comparatively simple and inexpensive construction which is adapted for use in connection with automobiles of standard make, this means being readily applied without necessitating any material changes in the construction of the automobile. Further objects will appear from the detailed description.

In the drawings:

Fig. 1 is a side view of the attachment as applied.

Fig. 2 is a plan view of the same.

Fig. 3 is a plan view of the brake lever and the bolt and pawl casing and the ratchet casing, and associated parts, partly in section.

Fig. 4 is a section taken substantially on the line 4—4 of Fig. 3.

Fig. 5 is a side view of the brake lever and associated parts on an enlarged scale.

Fig 6 is a detail of the bolt and pawl casing and associated parts.

Fig. 7 is a section taken substantially on the line 7—7 of Fig. 6.

Fig. 8 is a sectional view taken substantially on the line 8—8 of Fig. 6.

Fig. 9 is a sectional view taken substantially on the line 9—9 of Fig. 6.

Fig. 10 is a vertical section through the ratchet wheel and casing and associated parts of the modified form illustrated in Fig. 11, parts being shown in elevation.

Fig. 11 is a plan view, partly in section, of a modified form.

Fig. 12 is a detail showing a special operating plate applied to the brake lever.

Fig. 12ᵃ is a fragmentary plan view of the plate illustrated in Fig. 12 as applied.

Fig. 13 is a detail, partly in section, showing a mounting for the ratchet casing and the bolt and pawl casing.

Fig. 14 is a fragmentary side view of a modified form of brake lever pedal and associated parts.

Fig. 15 is a front view of the form illustrated in Fig. 14.

My attachment is intended to be used in connection with a brake pedal lever 1 which is connected to the transmission brake band of an automobile of known construction in a known manner. The upper arm 2 of this lever operates through an opening in the foot board 3 of the automobile structure. A pedal 4 is rigidly secured to the upper end of arm 2, this pedal being provided at each end with an upwardly extending ear 5, these ears confining the foot against lateral movement off of the pedal in a known manner. The pedal and associated parts so far described are of known construction and need not be further described in detail.

An angle lever 6 is pivotally mounted at its angle at 7 on a lug 8 extending from the under face of pedal 4. Upper arm 6ᵃ of this lever extends above the upper edge of the pedal so that, by raising the foot beyond the normal position which it occupies in operating the brake lever, arm 6ᵃ of the lever 6 can be depressed so as to cause rearward and upward movement of the lower arm 6ᵇ of this lever. To prevent accidental operation of the lever 6 I provide a guard 9 in the form of a plate which is hingedly secured at 10 to the left hand ear 5 of the pedal, this guard being provided on its under face with a rib 11 which contacts with the pedal to limit downward movement of the guard which, when in operative position, is inclined downwardly and inwardly of the pedal. As will be noted more clearly from Figure 4, guard 9 extends inwardly beyond rib 11 to provide a flange at 9ᵃ so that by inserting the edge of the shoe sole beneath this flange the guard can be readily turned by hinge 10 into inoperative position. When the guard is in operative position if the foot should be placed on the pedal too far to the left, that is so far to the left as to be apt to operate lever 6, it would slide off of the inclined upper surface of plate 9 in contact with the right hand ear 5. This provides means for preventing accidental operation of the lever. When the guard is turned into inoperative position the lever can be readily operated by raising the foot beyond the normal operating position for the lever, as above stated.

Arm 6ᵇ of lever 6 is connected by a flexible connection, such as a chain 12 to one arm 13 of a bell crank lever 14 which is secured on a shaft 15 rockably mounted in a casing 16 of suitable construction which is secured by bolts 17, or in any other suitable or preferred manner, to the under face of foot board 3. This casing is preferably so disposed that shaft 15 is in vertical position. A coil spring 18 is mounted about shaft 15 and has one end secured to bottom plate 16ª of casing 16, the other end of this spring being secured to a ratchet wheel 19 which is secured on a squared portion 15ª of shaft 15. This spring 18 is under tension and acts to turn ratchet wheel 19 in a clockwise direction as considered in Figure 3. This spring acts to take up slack in the flexible connection 12 and to normally hold the lever 6 in its raised inoperative position. Arm 13ª of the bell crank lever 14 is pivotally connected to a rod 20 which operates through an opening through dash board 21. This arm is pivotally connected at its forward end to an arm 22 secured on a shaft 23 rockably mounted in bearing brackets 24 secured on the forward face of dash board 21. An arm 25 is secured on shaft 22 adjacent the other end thereof and is connected by a rod 26 to operating arm 27 of the throttle valve of carburetor 28 of known construction. When the upper arm 6ª of lever 6 is depressed shaft 15 is rocked in such direction as to cause forward movement of rod 20, this movement of rod 20 being transmitted to rod 26 through shaft 23 and associated parts thus moving the operating arm 27 of the throttle valve of the carburetor in such direction as to open the valve thus accelerating the speed of the engine with which the valve is associated. Upon release of the lever it is returned to inoperative position by the action of spring 18 and associated parts, the operating arm 27 of the carburetor throttle valve being also returned to normal or closed position. In this manner, the driver of the automobile can readily accelerate the engine when desired and the accelerator lever is so positioned as to be readily operated by the same foot as is normally used in operating the brake lever.

It is desirable that means be provided to prevent operation of the accelerator when operating the brake lever for applying the brakes. With this object I provide means whereby the ratchet wheel 19, and consequently shaft 15, is locked against movement in operating direction when the brake lever is depressed. A casing or housing 29 is secured to the under face of foot board 3 in any suitable or preferred manner, this housing being disposed adjacent and at right angles to the casing 16. A bolt 30 is slidably mounted in housing 29 and is provided with a head 31 extending through an opening provided through the end of the housing adjacent arm 2 of lever 1 for this purpose. This bolt is provided at its inner end with an enlargement or flange 32 of approximately circular outline which operates in an approximately cylindrical extension 33 of housing 29. An expansion coil spring 34 is mounted in enlargement 33 and is confined between flange 32 and the inner wall of enlargement 33, the bolt having its inner side cut away to provide a recess 35 which accommodates the convolutions of spring 34. This spring acts to normally hold the bolt projected, movement of the bolt outwardly of the housing being positively limited by flange 32. The arm 2 of lever 1 is provided with a laterally projecting element 2ª and with a recess 2ᵇ adjacent the outer or forward end of element 2ª, this recess being adapted for reception of the rounded head 31 of bolt 30. When lever 1 is moved forwardly into operative position for applying the brakes, element 2ª of arm 2 contacts with head 31 of the bolt and forces the bolt into the housing 29 against the pressure of spring 34. Upon return of the lever to inoperative position the bolt is again moved into projected position by spring 34 so as to seat head 31 in recess 32, the bolt when in this position also acting to hold the lever against any undue looseness or play as well as to hold the lever in its inoperative position.

The bolt is provided, at its lower portion, with a slot extending from front to back thereof forming two spaced parallel arms 36 extending from the body portion of the bolt. These arms receive between them a squared element 37ª of an approximately L-shaped stem 37ᵇ of a pawl 37. An expansion coil spring 38 is mounted between arms 36 and is confined between element 37ª and body 30ª of bolt 30, this spring acting to normally hold the pawl projected. Movement of member 37ª outwardly between arms 36 is positively limited by inwardly projecting fingers 39 at the lower ends of these arms. The housing 29 is provided, at the upper edge of each lateral wall with an outwardly projecting flange 40, these flanges having elongated slots 41 therethrough which receive securing bolts 42. These bolts pass through the foot board 3 and through a cover plate 43, as well as through flanges 40, and nuts 44 are screwed onto the bolts and coact therewith for effectually securing the housing in position. If desired, cover plate 43 can be omitted though I usually prefer this as affording protection to the bolt and associated parts and also as serving to confine these parts in the casing. As will be noted more clearly from Fig. 8, the portion 29ª of the casing or housing 29 which extends beyond the enlarged portion 33 is of approximately rectangular cross section and the spring 38 is confined between plate 43 and the lower wall 29ᵇ of the housing, the element 37ª of pawl 37 being also similarly confined. In this manner the plate and the lower wall of the housing coact to hold the spring 38 and the pawl in proper operative position relative to the bolt and to each other.

The housing 29 is mounted adjacent the casing 16 and at right angles thereto with pawl 37 positioned to operate through an opening 45 through the adjacent side wall of casing 16, and to engage with the teeth of ratchet wheel 19 so as to lock this wheel against rotation in a counter-clockwise direction as considered in Figure 3. When the lever 1 is depressed for applying the brakes the element 2ª forces bolt 30 inwardly of casing 29 thus moving the pawl 37 into operative engagement with ratchet wheel 19. The pawl locks the wheel 19 against turning movement in a counter-clockwise direction so that the shaft 15 cannot be turned in such direction as to cause forward movement of the accelerator rod 26 in the event that the driver's foot accidentally depresses arm 6ª of lever 6. The teeth of the ratchet wheel 19 and pawl 37 are so related that the spring 18 can turn wheel 19 in a clockwise direction to take up any looseness or play in rod 20 and to hold the throttle valve of the carburetor in closed position to shut off the supply of fuel to the engine. When the lever 1 is returned to inoperative position the parts assume the relative positions illustrated in Figure 3 so that by operating lever 6 the engine of the automobile can be accelerated in the manner previously described.

A very important feature of my invention is its safeness and the automatic means whereby acceleration of the engine when applying or releasing the brakes, is prevented. This feature is of vital importance in the case of a threatened accident or collision. The driver of an automobile when confronted with an imminent collision, for example, would possibly become excited and might very possibly operate lever 6 when depressing the brake pedal lever. If such accidental operation of the rock lever 6 resulted in accelerating the engine of the automobile the result would, of course, be disastrous. All possibility of this occurring is eliminated by the provision of spring 18, and chain 12, in conjunction with the ratchet wheel and associated parts. The spring acts to turn ratchet wheel 19 in a clockwise direction, as considered in Figure 3, so as to normally hold the carburetor throttle valve closed and shut off the supply of fuel to the engine of the automobile. If in applying the brake in an emergency, arm 6ª of lever 6 should be slightly depressed, this will have no appreciable effect upon the throttle valve as the chain 12 will be immediately slacked due to the forward and downward movement of the brake lever. The spring 18 will then act to instantaneously close the throttle valve. In such a case, any opening of the throttle valve will be so slight and the period during which it is open will be so minute, that this slight opening and instantaneous closing of the throttle valve will have no effect whatever on the engine. Continued movement of the brake lever in brake applying direction imparts additional slack to chain 12, and the pawl 37 is simultaneously forced into engagement with ratchet wheel 19 and positively locks it against movement in throttle valve opening direction. As will be noted from Figure 3, the pawl and the teeth of the ratchet are so related as to permit spring 18 to turn the ratchet wheel in throttle valve closing direction when the pawl is in engagment with the ratchet wheel. By means of this arrangement, if arm 6ª of lever 6 were depressed to its greatest extent in applying the brakes, the chain 12 is slacked and the ratchet wheel is locked against rotation in throttle valve opening direction practically instantaneously with movement of lever 6, and spring 18 acts to immediately turn ratchet wheel 19 in throttle valve closing direction and to close the throttle valve. In this case, the pawl rides over the teeth of the ratchet wheel during turning thereof by spring 18, spring 38 permitting the pawl to be moved into the bolt for this purpose. In either case, whether the lever 6 is accidentally operated to a slight extent only or to its greatest extent in applying the brakes, the throttle valve can not possibly be opened sufficiently to produce any accelerating effect on the engine. This is a very important feature of my invention and renders it absolutely safe even though the driver may become excited in an emergency and not be in a condition to pay careful attention to the manner in which he operates the brake lever.

Another very important feature of my invention resides in the fact that the accelerator can not be operated when releasing the brakes. As above pointed out, the ratchet wheel 19 is positively locked by the pawl 37 against rotation in throttle valve opening direction when the brakes are applied. The element 2ª of the brake lever is of such length that bolt 30 is held in its inner or operative position until the brake lever is returned to full raised or inoperative position, and chain 12 is of such length that it is free of slack and holds arm 6ª of lever 6 raised when the brake lever is in such position. In this connection, it should be noted that spring 18 is of proper strength to operate in the manner previously described, while permitting the brake lever to be returned to full inoperative position by a spring or equivalent means commonly provided for that purpose. On release of the brake pedal it is returned to raised position provided arm 6ª of rock lever 6 is not depressed. If arm 6ª is depressed, chain 12 will become taut and upwardly movement of the brake lever will be arrested as the brake lever approaches its full raised position. This will cause upward pressure to be exerted on arm 6ª upon which the driver's foot is resting, thus apprising him of the fact that he is holding arm 6ª of lever 6 depressed. When the driver removes his foot from arm 6ª the brake lever is raised into full inoperative position and chain 12 causes lever 6 to turn about its pivot into operative position relative to the pedal.

In Figures 1 and 2 of the drawings I have illustrated the attachment as used in connection with a carburetor at the right hand side of the engine of the automobile, though it is equally well adapted for use in connection with a carburetor at the left hand side of the engine, or in any other suitable position; the connections between the lever 14 and the carburetor being varied to suit the conditions of the particular case.

In the modified form illustrated in Fig. 11 the bell crank lever 14 is secured on shaft 15 and replaced by a lever 14ª which is secured between its ends on the shaft 15, one end of this lever being connected by a chain 12 to lever 6 and the other end of this lever being connected by a link 46 and a clamp 47 to an accelerator rod 48, this rod being the accelerator rod commonly employed with an ordinary foot accelerator mounted on the foot board separately from the foot brake pedal. In this form the bolt 30 and associated parts are omitted and a pawl 49 is pivotally mounted in ratchet casing 50, this pawl being urged toward the ratchet wheel 19 by a tension spring 51 secured to the lower end of the pawl and to foot board 3. The upper end of the pawl is connected by a chain 52 to a pedal 4ª, this chain passing through a suitable opening through foot board 3. The brake lever pedal 1 is normally held in its raised or inoperative position by a spring-pressed bolt 53 carried by the casing 54 secured to the foot board 3, arms 2ᶜ of the lever being provided with a recess 2ᵈ for reception of this bolt, the head of which is rounded as illustrated. When the pedal is depressed chain 52 is slacked and pawl 49 is moved by spring 51 into engagement with ratchet 19 thus locking the ratchet against movement in a counterclockwise direction as considered in Figure 11. This effectually prevents operation of the accelerator rod 48 in the event that the lever 6 is accidentally operated by the driver's foot. The pedal 4ª is preferably cut away at 4ᵇ to permit proper movement of the lower arm 6ᵇ of lever 6. When the pedal is raised into its inoperative position pawl 49 is disengaged from ratchet wheel 19 and when the upper arm 6ª of lever 6 is depressed lever 14ª is operated so as to impart forward movement to the accelerator rod 48. In Figure 11 the casing 16 is replaced by two spaced triangular plates 50ª secured together at their apexes by a spacing rod 50ᵇ and provided at their bases with flanges 50ᶜ for securing the plates to the foot board. The pawl 49 and shaft 15 are operatively supported by and mounted between these blades in the same manner as these members are supported by casing 16.

A stop member or button 52ª is secured on chain 52 in position to contact with the forward face of foot board 3 when the brake lever is in its full raised position. This button serves to prevent upward and rearward movement of pedal 4ª to such an extent as to turn lever 14ª in throttle valve opening direction. In the event that chain 52 breaks or becomes disconnected, pawl 49 will be immediately moved into engagement with ratchet wheel 19 and will lock it against movement in throttle valve direction. This effectually prevents opening of the throttle if chain 52 breaks and the brake lever moves upwardly and rearwardly beyond its normal raised or inoperative position. The bolt 53 serves to hold the brake lever in its normal inoperative position and to prevent any looseness or play of the lever, and such as might tend to operate lever 14ª and interfere with the smooth and uniform operation of the accelerator device as a whole. The bolt 30 also performs a similar function in the form illustrated in Figure 3, in addition to providing means for operating the pawl 37 in the manner previously described. The rod 46 can be connected to the throttle valve arm of the carburetor instead of to the accelerator rod 48, if desired and in the form illustrated in Figure 3, arm 13ª of lever 13 can be connected to the accelerator 48 of Fig. 11. In this respect, the various forms of the device are interchangeable, as the proper connections for these variations will be obvious it is not thought necessary to illustrate or describe them in detail. If the accelerator is connected to the rod of a foot accelerator such as are in common use, it will prove a convenience in starting the engine. In this case, the starter button or rod can be operated by the left foot and the accelerator by the right foot. This is also of convenience in driving in heavy traffic where it is frequently necessary to make quick stops and starts. This gives very ready and quick control of the automobile which is very desirable in driving in heavy traffic.

In Figures 12 and 12ª I have illustrated a plate which may be applied to brake lever 1 thus adapting the device for use in connection with a brake lever of standard construction. This plate 54 is secured by rivets 55, or in any other suitable manner to arm 2 of lever 1 and is curved longitudinally on an arc struck from the axis of movement of lever 1. This plate is shaped to provide a depression 56 and a raised portion 58, this depression and the raised portion corresponding to depression 2$^b$ and the raised portion 2$^a$ of Figure 3.

Portion 58 of the plate is curved inwardly under the arm 2 of lever 1 providing in effect, a cam element 59. When this plate is used, it is moved out of contact with the head of bolt 30 when the brake lever is completely depressed, the head of the bolt being positioned beneath arm 2. When the brake lever is released and as it returns to raised position, element 59 contacts with the head of the bolt moving it into its inner position within casing 29. This bolt is held in this position until the brake lever is in its full raised position, at which time the head of the bolt passes into recess 56 and holds the brake lever against looseness or play in the same manner as the bolt secures the brake lever in the form illustrated in Figure 3. The use of this plate provides simple and efficient means whereby the device can be readily adapted for use with brake levers of standard construction.

In Figure 13 I have illustrated a bracket 59' for supporting the housings or casings for the bolt and associated parts. In this form the housing 29 for the bolt and associated parts is disposed in horizontal position and not inclined transversely as it is when secured to the foot board 3. In all other respects the construction and operation of this form is the same as that previously illustrated and described.

Figures 14 and 15 illustrate a modified form of brake lever pedal. The pedal 60 is provided adjacent its upper end with a thickened or raised portion 61. The lever 62 is pivoted at 63 on arm 2 of the brake lever, lever 62 being positioned beneath pedal 60. The raised portion 61 acts to hold the driver's foot at an angle of approximately 45° to the pedal when applying the brakes and effectually prevents accidental operation of lever 62. Lever 62 is connected to the accelerator operating means in the same manner as lever 6.

As will be noted, and as above indicated, changes in the construction and arrangement of parts of the invention may be resorted to without departing from the field and scope of the same, and I intend to include all such variations, as fall within the scope of the appended claims, in this application in which a preferred form only of my invention is disclosed.

What I claim is:

1. In combination with an automobile including a foot brake lever and a carburetor, an accelerator lever mounted on the foot brake lever adjacent the pedal thereof, a guard member mounted on the pedal and normally positioned to prevent accidental contact of the driver's foot with the accelerator lever when operating the foot brake lever, said guard member being movable into and out of operative position, and operating connections between the accelerator lever and the carburetor.

2. In combination with an automobile including a foot brake lever and a carburetor, an accelerator lever mounted on the foot brake lever adjacent the pedal thereof, operating connections between the accelerator lever and the carburetor, and means for rendering said connections inoperative in accelerating direction when the brake lever is depressed while permitting depressing of the brake lever.

3. In combination with an automobile including a foot brake lever and a carburetor, an accelerator lever mounted on the foot brake lever adjacent the pedal thereof, a rockably mounted shaft, operating connections between the shaft and the carburetor, connections between the shaft and the accelerator lever for turning the shaft in accelerating direction when the lever is moved in operating direction, the connections between the accelerator lever and the shaft permitting depressing of the brake lever, and means for locking the shaft against turning movement in accelerating direction when the brake lever is depressed.

4. In combination with an automobile including a foot brake lever and a carburetor, an accelerator lever mounted on the foot brake lever adjacent the pedal thereof, a rockably mounted shaft, operating connections between the shaft and the carburetor, a flexible connection between the shaft and the rearward end of the accelerator lever for turning the shaft in one direction when the forward end of the accelerator lever is depressed, said accelerator lever being pivoted between its ends, connections between the shaft and the carburetor throttle valve for opening the valve when said shaft is turned in said direction, yieldable means for normally holding the shaft in throttle valve closing position, and means actuated by movement of the brake lever into operative position for locking the shaft against turning movement into throttle valve opening position.

5. In combination with an automobile including a foot brake lever and a carburetor, an accelerator lever mounted on the foot brake lever adjacent the pedal thereof, a rockably mounted shaft, operating connections between the shaft and the carburetor, a flexible connection between the shaft and the rearward end of the accelerator lever for turning the shaft in one direction when the forward end of the accelerator lever is depressed, said accelerator lever being pivoted between its ends, connections between the shaft and the carburetor throttle valve for opening the valve when said shaft is turned in said direction, yieldable means for normally holding the shaft in throttle valve closing position, a ratchet wheel secured on said shaft, a pawl adapted for cooperation with the ratchet wheel to lock the latter and the shaft against turning movement in valve opening direction, and means controlled by the brake lever for normally holding the pawl out of engagement with the ratchet wheel and for moving the pawl into engagement with said ratchet wheel when said brake lever is depressed.

6. In combination with an automobile having a foot brake lever and a carburetor, an accelerator lever mounted on the foot brake lever adjacent the pedal thereof, a rockably mounted shaft, operating connections between the shaft and the carburetor, a flexible connection between the shaft and the rearward end of the accelerator lever for turning the shaft in one direction when the forward end of the accelerator lever is depressed, said accelerator lever being pivoted between its ends, connections between the shaft and the carburetor throttle valve for opening the valve when said shaft is moved in said direction, yieldable means for normally holding the shaft in throttle valve closing position, a ratchel wheel secured on said shaft, a casing mounted adjacent the brake lever, a bolt slidable in the casing with its outer end contacting with the brake lever, said brake lever being provided with a member projecting in the direction of the bolt and disposed to force the bolt into the casing when the brake lever is depressed, means normally holding the bolt projected, and a pawl carried by the inner end of the bolt and disposed to engage with the ratchet wheel and lock it against turning movement in throttle valve opening direction when the bolt is forced into said casing.

7. In combination with an automobile including a foot brake lever and a carburetor, an accelerator lever mounted on the foot brake lever adjacent the pedal thereof, a rockably mounted shaft, operating connections between the shaft and the carburetor, a flexible connection between the shaft and the rearward end of the accelerator lever for turning the shaft in one direction when the forward end of the accelerator lever is depressed, said accelerator lever beng pivoted between its ends, connections between the shaft and the carburetor throttle valve for opening the valve when said shaft is turned in said direction, yieldable means for normally holding the shaft in throttle valve closing position, a ratchet wheel secured on said shaft, a casing mounted adjacent the brake lever, a bolt slidable in the casing with its outer end contacting with the brake lever, said brake lever being provided with a member projecting in the direction of the bolt and disposed to force the bolt into the casing when the brake lever is depressed, means normally holding the bolt projected, a pawl slidably mounted in the inner end of the bolt and disposed to engage with the ratchet wheel and lock it against turning movement in throttle valve opening direction when the bolt is forced into said casing, and yielding means for holding the pawl projected relative to the bolt.

8. In combination with a brake pedal lever, a member carried by said lever and projecting beyond the same for contact with a spring pressed member to be operated thereby, the lever carried member having means cooperating with the spring pressed member for holding said lever in a predetermined position.

9. In combination with an automobile including a foot brake lever and a carburetor, an accelerator lever carried by the brake lever, operating connections between the accelerator lever and the carburetor, means for preventing accelerating operation of said connections when the brake lever is depressed, and means for releasably securing the brake lever in raised position and for holding it against play.

10. In combination with an automobile including a foot brake lever and a carburetor, means for preventing accelerating operation of said means when the brake lever is depressed, an accelerator lever carried by the brake lever, operating connections between the accelerator lever and the carburetor, and means coacting with the means for preventing accelerating operation of said connections for releasably securing the brake lever in raised position and for holding it against play.

11. In a device of the character described, a casing, a spring pressed bolt slidable in and normally projecting beyond the casing, a pawl including an element slidable in the bolt from one end thereof, means limiting outward movement of the pawl relative to the bolt, and a spring confined between said element of the pawl and the body of the bolt and acting to normally hold the pawl projected.

In testimony whereof I affix my signature.

HARRY L. QUINTENZ.